(12) United States Patent
Ikeda et al.

(10) Patent No.: US 8,836,649 B2
(45) Date of Patent: Sep. 16, 2014

(54) INFORMATION PROCESSING APPARATUS, INFORMATION PROCESSING METHOD, AND PROGRAM

(75) Inventors: Tetsuo Ikeda, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 12/646,342

(22) Filed: Dec. 23, 2009

(65) Prior Publication Data
US 2010/0171716 A1 Jul. 8, 2010

(30) Foreign Application Priority Data
Jan. 5, 2009 (JP) ................................. P2009-000416

(51) Int. Cl.
G06F 3/041 (2006.01)
G06F 3/0488 (2013.01)

(52) U.S. Cl.
CPC .................................. G06F 3/04883 (2013.01)
USPC ........................................................ 345/173

(58) Field of Classification Search
None
See application file for complete search history.

(56) References Cited

U.S. PATENT DOCUMENTS 6,972,752 B2 * 12/2005 Nako et al. ..................... 345/173
7,203,455 B2 * 4/2007 Ernst et al. ..................... 434/317
2006/0187142 A1 * 8/2006 Lesniak .......................... 345/1.1
2008/0055266 A1 3/2008 Harada et al.
2008/0259053 A1 10/2008 Newton
2009/0058830 A1 * 3/2009 Herz et al. ..................... 345/173
2010/0298032 A1 * 11/2010 Lee et al. ....................... 455/566
2011/0109567 A1 * 5/2011 Kim ............................... 345/173
2011/0169754 A1 * 7/2011 Miyazawa et al. ............. 345/173

FOREIGN PATENT DOCUMENTS

JP 2007-052497 3/2007

OTHER PUBLICATIONS

Mar. 21, 2013, EPO Communication regarding related application No. EP 09 25 2703.

* cited by examiner

*Primary Examiner* — Joseph Haley
*Assistant Examiner* — Emily Frank
(74) *Attorney, Agent, or Firm* — Sherr & Jiang, PLLC

(57) ABSTRACT

An information processing apparatus according to the present invention is provided which includes a display panel for displaying a plurality of objects, a plane area detection unit for detecting an operation tool positioned on the display panel and for detecting a plane area corresponding to the operation tool on the display panel, a direction detection unit for detecting a moving direction of the operation tool based on variation of position of the plane area according to time detected by the plane area detection unit, a contact determination unit for determining whether the operation tool is in contact with the display panel based on the plane area detected by the plane area detection unit, and an application control unit for controlling an application according to a contact determination result by the contact determination unit and the moving direction of the operation tool detected by the direction detection unit.

9 Claims, 11 Drawing Sheets

FIG. 6A
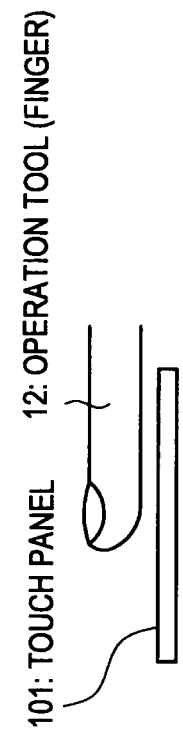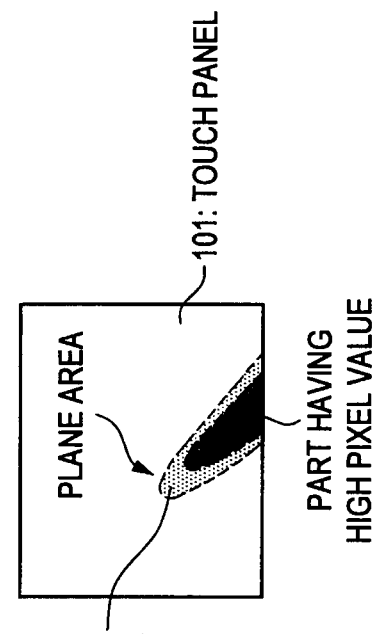
FIG. 6B
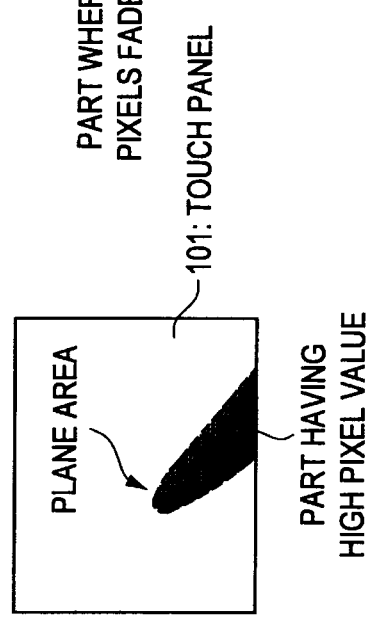

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In recent years, there are many compact electronic devices and automatic transaction devices on each of which there is mounted a touch panel for a user to directly touch the display screen for manipulating the object displayed within the screen. Use of the touch panel can provide advantages such as realizing intuitive operation and enabling even a user unfamiliar with keyboard or keypad operation to easily perform operation. There are some recent electronic devices in which the display object displayed within the screen is moved or predetermined processing is performed by this movement operation, by a user operating a touch panel thereof.

In relation to such technology, there is disclosed in Japanese Unexamined Patent Application Publication No. 2007-52497 a technology related to an optical touch panel on which operation can be performed without direct touch on it. Use of the optical touch panel disclosed in the above-cited document enables a user to perform operation without touching the touch panel itself and improves user operability.

SUMMARY OF THE INVENTION

As described above, user operability can be improved by using the optical touch panel. However, there has not been known a technology for relating contact state or proximity state of an optical touch panel and an operation tool with application control and for improving operability of application. There is desired a technology for improving operability of application by taking advantage of the convenience of optical touch panel.

In light of the foregoing, it is desirable to provide a novel and improved information processing apparatus, information processing method and program, capable of improving operability of application by determining whether an operation tool and an optical touch panel are in contact state or in proximity state and controlling the application in accordance with a determination result.

According to an embodiment of the present invention, there is provided an information processing apparatus including a display panel for displaying a plurality of objects, a plane area detection unit for detecting an operation tool positioned on the display panel and for detecting a plane area corresponding to the operation tool on the display panel, a direction detection unit for detecting a moving direction of the operation tool based on variation of position of the plane area according to time detected by the plane area detection unit, a contact determination unit for determining whether the operation tool is in contact with the display panel based on the plane area detected by the plane area detection unit, and an application control unit for controlling an application according to a contact determination result by the contact determination unit and the moving direction of the operation tool detected by the direction detection unit.

According to such configuration, the plurality of objects are displayed on the display panel. Moreover, the plane area detection unit detects the operation tool positioned on the display panel and detects the plane area corresponding to the operation tool on the display panel. The direction detection unit detects the moving direction of the operation tool based on the variation of position of the plane area according to time detected by the plane area detection unit. Moreover, the contact determination unit determines whether the operation tool is in contact with the display panel based on the plane area detected by the plane area detection unit. Moreover, the application control unit controls the application according to the contact determination result by the contact determination unit and the moving direction of the operation tool detected by the direction detection unit.

The plane area detection unit preferably transmits to the contact determination unit the pixel value of one or more pixels included in the plane area among pixels constituting the display panel, and the contact determination unit preferably determines if the operation tool is in contact with, in proximity to, or in neither of contact with nor proximity to, the display panel, according to the pixel value of the one or more pixels constituting the plane area.

When there is an area larger than a predetermined area within the plane area, having a plurality of pixels with pixel values higher than a predetermined threshold value, the contact determination unit may determine that the operation tool is in contact state, and when the plane area consists of an area having a plurality of pixels with pixel values higher than a predetermined threshold value and an area where pixel values of a plurality of pixels fade towards the outside, the contact determination unit may determine that the operation tool is in proximity state.

The direction detection unit may additionally calculate the moving speed of the operation tool based on the variation of position of the plane area according to time, and the application control unit, when the moving speed is greater than a predetermined threshold value, may control the application according to the contact determination result and the moving direction of the operation tool.

The information processing apparatus may include two display panels, the plane area detection unit may detect each of the plane area formed by the operation tool on the each display panel, the direction detection unit may further detect a moving direction of the operation tool moving from one of the two display panels to the other, and the contact determination unit may determine contact state of the operation tool on the each display panel.

The application controlled by the application control unit may be an application for allowing an object having different content to be displayed on each of the two display panels, and the application control unit, when the movement of the operation tool detected by the direction detection unit is a single movement from one of the two touch panels to the other, may update the content of the object displayed on the each display panel.

According to another embodiment of the present invention, there is provided an information processing method, including the steps of displaying a plurality of objects, detecting an operation tool positioned on the display panel and for detecting a plane area corresponding to the operation tool on the display panel, detecting a moving direction of the operation tool based on variation of position of the plane area according to time detected by the plane area detection unit, determining whether the operation tool is in contact with the display panel based on the plane area detected by the plane area detection unit, and controlling an application according to a contact determination result by the contact determination unit and the moving direction of the operation tool detected by the direction detection unit.

According to another embodiment of the present invention, there is provided a program to cause a computer including a display panel for displaying a plurality of objects to realize functions of detecting an operation tool positioned on the display panel and for detecting a plane area corresponding to the operation tool on the display panel, detecting a moving direction of the operation tool based on variation of position of the plane area according to time detected by the plane area detection unit, determining whether the operation tool is in contact with the display panel based on the plane area detected by the plane area detection unit, and controlling an application according to a contact determination result by the contact determination unit and the moving direction of the operation tool detected by the direction detection unit.

According to the embodiments of the present invention described above, it is possible to improve operability of application by determining whether an operation tool and an optical touch panel are in contact state or in proximity state and controlling the application in accordance with a determination result.

BRIEF DESCRIPTION OF THE DRAWINGS

FIG. 6A is an explanatory diagram for explaining an example of the information processing method according to the embodiment;

FIG. 6B is an explanatory diagram for explaining an example of the information processing method according to the embodiment;

DETAILED DESCRIPTION OF THE EMBODIMENT

Figure 1A:
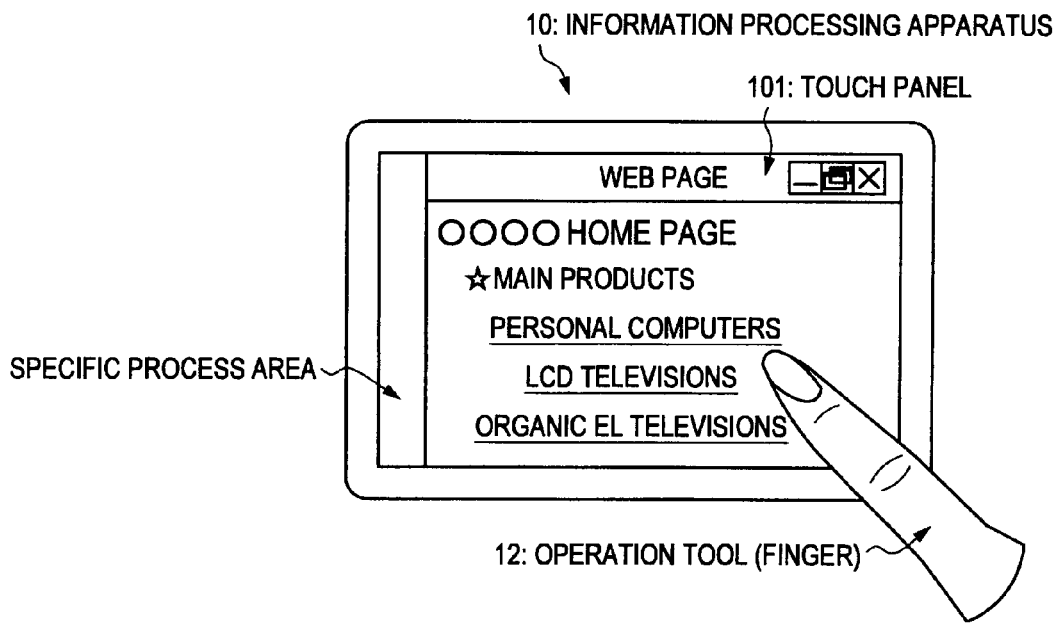
FIG. 1A is an explanatory diagram for explaining an example of the external appearance of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
(1) Objective
(2) First embodiment
   (2-1) Regarding an external appearance of an information processing apparatus
   (2-2) Regarding a configuration of the information processing apparatus
   (2-3) Regarding an information processing method
   (2-4) Regarding an application example of the information processing method
(3) Regarding a hardware configuration of the information processing apparatus according to each embodiment of the present invention
(4) Summary <Objective>

Prior to the explanation of an information processing apparatus and an information processing method according to each embodiment of the present invention, the objective of the present invention will be described first.

In touch panel operation using a capacitive touch panel in the related art, it was necessary to touch the screen in order for various gestures to be recognized by the touch panel. Accordingly, there were issues that various types of objects which are the objects of operation are sometimes hidden by a finger which is an operation tool, or that the screen itself sometimes gets dirty with fingerprints or oil. There was also an issue that the touch panel was difficult to be operated with a dirty or wet hand since it would have a harmful effect on the touch panel. Furthermore, when operation was performed by touching the screen, other operations than was being performed have to be performed separately such as by GUI buttons, so that there was an issue that a device itself became large or the operability was degraded.

On the other hand, when using a so-called optical touch panel, issues such as those described above can be avoided, but there has not been known a technology for relating contact state or proximity state of an optical touch panel and an operation tool with application control and for improving operability of application. Accordingly, in the embodiment of the present invention described in the following, it is intended to provide a technology for improving operability of application by determining whether an operation tool and an optical touch panel are in contact state or in proximity state and controlling the application in accordance with a determination result.

(First Embodiment)
<Regarding an External Appearance of an Information Processing Apparatus>

Figure 1B:
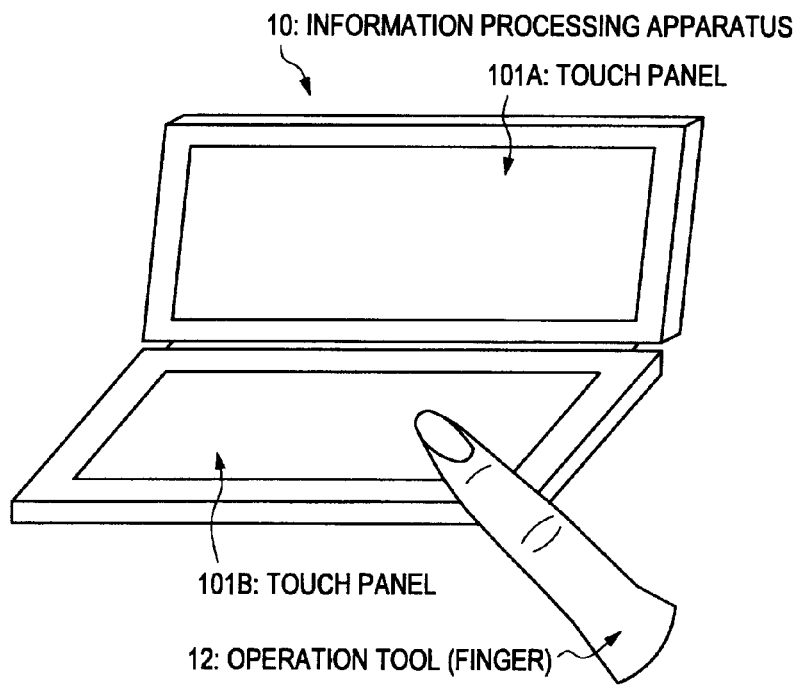
FIG. 1B is an explanatory diagram for explaining an example of the external appearance of the information processing apparatus according to the embodiment.

First, an overall configuration of an information processing apparatus according to a first embodiment of the present invention will be described with reference to FIG. 1A and FIG. 1B. FIG. 1A and FIG. 1B are explanatory diagrams for explaining an external appearance of an information processing apparatus 10 according to the present embodiment. In addition, description will be made in the following, taking an example of a case where the information processing apparatus 10 runs a WWW browser for displaying a homepage on the display screen of a display unit.

As shown in 1A, there is provided on the information processing apparatus 10 a display unit having a touch panel 101 (abbreviated as "touch panel 101" hereinafter). A variety of information such as homepage on the Internet is displayed on the touch panel 101, as shown in FIG. 1A. A predetermined processing such as scrolling is applied to the variety of information displayed on the touch panel 101 corresponding to touch or movement of the operation tool 12. Moreover, a special process area may be provided on the touch panel 101. In this special process area, for example, an object such as icon for performing predetermined processing is displayed, and by selecting this special process area, the predetermined processing related with the displayed object is performed.

The information processing apparatus 10 not only performs particular processing such as selection of the object or movement of the displayed content corresponding to touch or movement of the operation tool 12. For example, when the operation tool 12 moves while drawing a predetermined trajectory in contact with the touch panel 101, the information processing apparatus 10 performs predetermined processing corresponding to the trajectory described by the operation tool 12. That is, the information processing apparatus 10 has a gesture input function. For example, when a predetermined gesture is input, an application related with the gesture is activated, or predetermined processing related with the gesture is performed.

A user's finger is used as the operation tool 12, for example. Also, a stylus or touch pen is sometimes used as the operation tool 12, for example. Moreover, an arbitrary object can be the operation tool 12 when the touch panel 101 is an optical type. When the touch panel 101 is the optical touch panel, even a soft implement such as brush, which is hardly pressed against the touch panel 101, can be also used as the operation tool 12, for example. Furthermore, when the touch panel 101 is an in-cell type optical touch panel, any object can be the operation tool 12, provided that the shadow thereof is cast upon the touch panel 101.

Here, the in-cell type optical touch panel will be simply described. There are several kinds in the optical touch panel. For example, there is a relatively well known optical touch panel of a system in which an optical sensor is provided on the outer frame of a liquid crystal panel constituting a liquid crystal display and a position and a moving direction of the operation tool 12 in contact with the liquid crystal panel is detected by this optical sensor. Unlike this system, the in-cell type optical touch panel has a liquid crystal panel equipped with an optical sensor array, and has a mechanism of detecting, by this optical sensor array, the position and the moving direction of the operation tool 12 in contact with or in proximity to the liquid crystal panel.

More specifically, an optical sensor and a read circuit are formed on a glass substrate of the optical touch panel, and light incident thereon from the outside is detected by the optical sensor and its intensity is read out by the read circuit, to thereby recognize the shade of the operation tool 12. Thus, in the in-cell type optical touch panel, the shape, a contact area and the like of the operation tool 12 can be recognized based on the shade of the operation tool 12. Accordingly, an operation by contact "plane" which has been regarded as difficult by other optical touch panel can be realized. Moreover, by applying the in-cell type optical touch panel, it is possible to obtain benefits such as improvement of recognition accuracy and display quality, as well as improvement of the design of the liquid crystal display and the like equipped with the in-cell type optical touch panel.

The object of the present embodiment is to realize a convenient operation system by using the touch panel 101 with which an operation by contact "plane" is possible like the in-cell type optical touch panel described above.

In addition, the configuration of the information processing apparatus 10 equipped with the touch panel 101 can be changed, for example, as shown in FIG. 1B. In an example shown in FIG. 1B, the information processing apparatus 10 includes tow touch panels 101A and 101B, and members provided with each of the touch panels are foldably connected to each other. In such foldable information processing apparatus 10, a user can separately operate on each of the touch panels 101A and 101B by operating the operation tool 12. Moreover, an operation moving from one of the touch panels 101A and 101B to the other can be performed.

Figure 2:
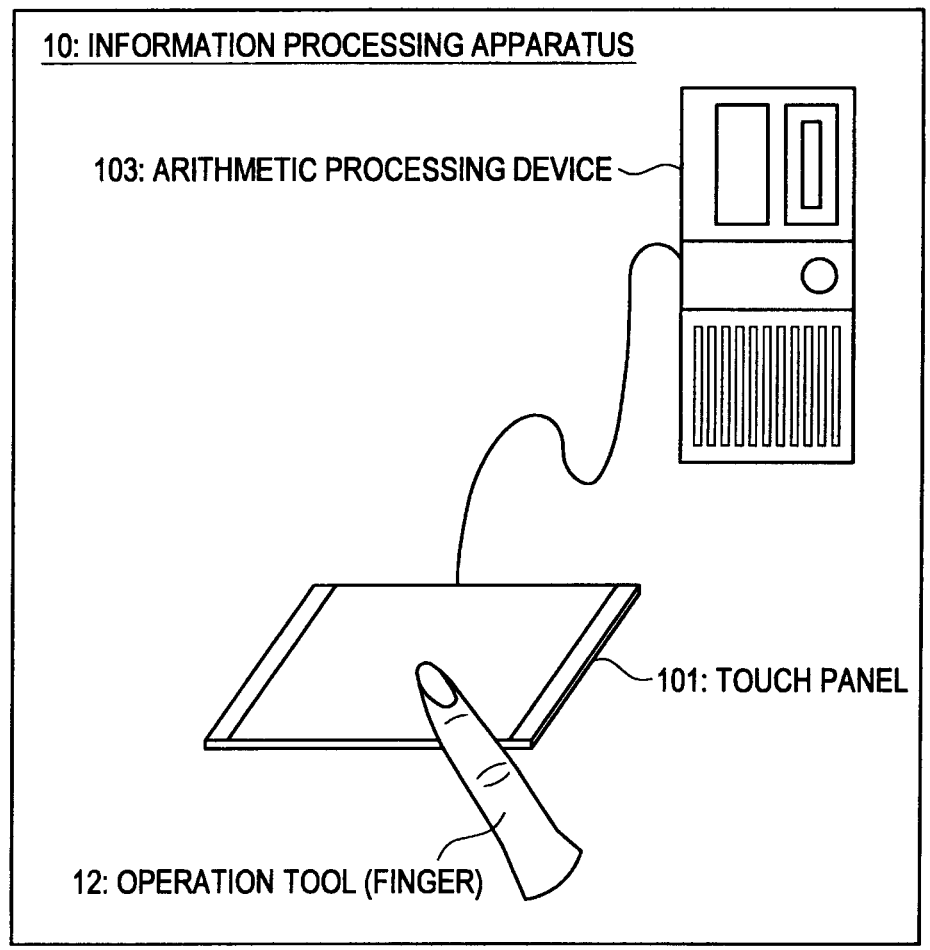
FIG. 2 is an explanatory diagram for explaining an example of the external appearance of the information processing apparatus according to the embodiment.

Moreover, the configuration of the information processing apparatus 10 equipped with the touch panel 101 can be changed, for example, as shown in FIG. 2. In an example of FIG. 2, the touch panel constituting the information processing apparatus 10, and an arithmetic processing device 103 for processing positional information and the like of the operation tool 12 detected by the touch panel 101, are separately configured. In a case of this configuration example, processing of data generated in accordance with the movement processing of the object or the movement of the object is performed by the arithmetic processing device 103. Thus, the configuration of the information processing apparatus 10 can be freely changed according to an embodiment.

In addition, the function of the information processing apparatus 10 is realized, for example, by a portable information terminal, a cell phone, a portable game machine, a portable music player, a broadcast equipment, a personal computer, a car navigation system, an intelligent home appliance, or the like.

<Regarding a Configuration of the Information Processing Apparatus>

Figure 3:
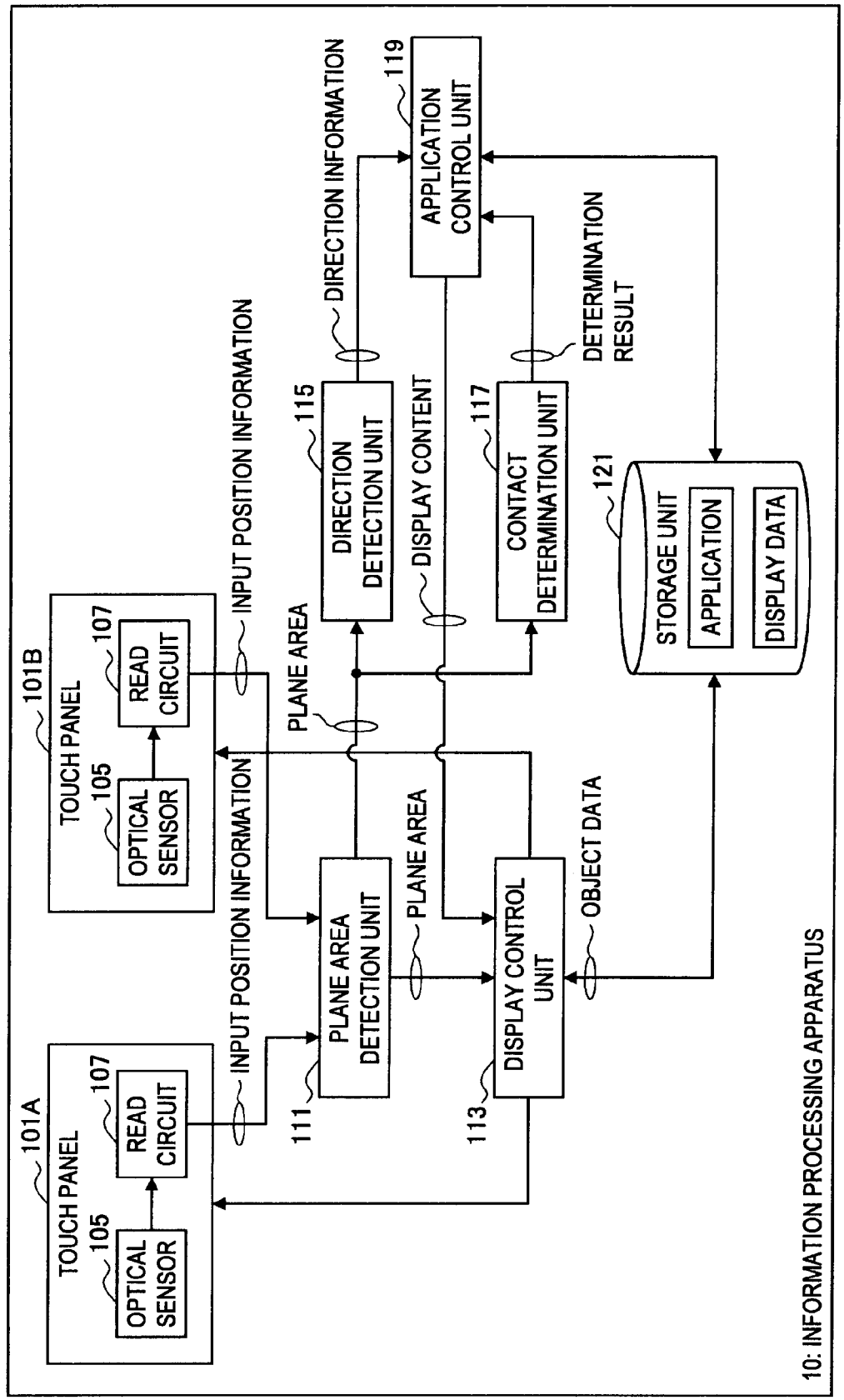
FIG. 3 is a block diagram for explaining a configuration of the information processing apparatus according to the embodiment.

Subsequently, a configuration of the information processing apparatus according to the present embodiment will be described in detail with reference to FIG. 3. FIG. 3 is a block diagram for explaining the configuration of the information processing apparatus according to the present embodiment. FIG. 3 illustrates the configuration in the case where the information processing apparatus 10 has the two touch panels 101A and 101B.

The information processing apparatus 10 according to the present embodiment mainly includes the two touch panels 101A and 101B, plane area detection unit 111, a display control unit 113, a direction detection unit 115, a contact determination unit 117, an application control unit 119, and a storage unit 121.

The touch panels 101A and 101B has a display function of displaying a variety of images including an object and a sensor function of detecting a contact part of the operation tool 12 in contact with the screen. An example of the display function of the touch panels 101A and 101B is a function of displaying object data input from the display control unit 113 described later. At this time, the touch panels 101A and 101B display the object data, based on positional information of the object input along with the object data. On the other hand, as for the sensor function of the touch panels 101A and 101B, the touch panels 101A and 101B are equipped each with a mechanism of recognizing the contact part of the operation tool 12 as a "plane" area, as described above.

As shown in FIG. 3, each of the touch panels 101A and 101B includes an optical sensor 105 and a read circuit 107. The each optical sensor 105 detects intensity of light incident thereon from the outside of the touch panels 101A and 101B. Moreover, the read circuit 107 detects the shadow of the operation tool 12 by reading out the intensity of the light detected by the optical sensor 105. For example, when the operation tool 12 contacts the touch panel 101A and/or 101B, the shadow of the operation tool 12 is cast upon the touch panels 101A and/or 101B. The cast shadow of the operation tool 12 is detected by the optical sensor 105. The shadow detected by the optical sensor 105 is read out by the read circuit 107. The information read out by the read circuit 107 includes the position and the shape of the shadow, pixel values and the like (referred to as "shadow data" hereinafter). Such shadow data is transmitted as input positional information from the read circuit 107 to the plane area detection unit 111.

The plane area detection unit 111 is constituted by, for example, a CPU (Central Processing Unit), ROM (Read Only Memory), and RAM (Random Access Memory) and the like. Concerning each shadow data transmitted at every predetermined time interval (e.g., at every several milliseconds to several hundred milliseconds) from the read circuit 107 of each of the touch panels 101A and/or 101B, the plane area detection unit 111 detects the plane area corresponding to the operation tool 12. For example, assume a case where the operation tool 12 contacts the touch panel 101A and/or 101B. One part of the operation tool 12 that directly in contact with the touch panel 101A and/or 101B and the other part of the operation tool 12 that is in proximity to the touch panel 101A and/or 101B within equal to or less than a predetermined distance are both detected as shadow (i.e., pixel value(s)), and its shadow data is transmitted as input positional information to the plane area detection unit 111. The shadow data contains assembled coordinate values where intensity of reflection light is less than a predetermined value due to the shadow of the operation tool 12. Then, the plane area detection unit 111 refers to the shadow data and detects a group of continuous coordinate values. In this regard, however, continuity of the coordinate values may be determined in the manner that coordinate values are determined as consecutive if a distance between the coordinate values is equal to or less than a predetermined distance. The group of the coordinate values detected by the plane area detection unit 111 is recognized as a plane area corresponding to the operation tool 12. Plane area information is transmitted from the plane area detection unit 111 to the display control unit 113, the direction detection unit 115, and the contact determination unit 117.

The display control unit 113 is a control means that controls contents to be displayed on the touch panels 101A and/or 101B. For example, the display control unit 113 reads out object data recorded in the storage unit 121 described later, and displays the object data on the touch panels 101A and/or 101B. At this time, the display control unit 113 specifies a display position of an object to the touch panels 101A and/or 101B, and causes the touch panels 101A and/or 101B to display the various types of object data at the specified display position. For this purpose, the display control unit 113 holds information indicating the display position of an object to be displayed on the touch panels 101A and/or 101B.

The display control unit 113 receives plane area information from the plane area detection unit 111. For example, as the operation tool 12 in contact with or in proximity to the touch panel 101A and/or 101B moves, the display control unit 113 receives the plane area information from the plane area detection unit 111 in real time. Moreover, the display control unit 113 receives information about display content that a running application should display on the display screen from the application control unit 119 described later.

The direction detection unit 115 is constituted by, for example, a CPU, a ROM (Read Only Memory), a RAM (Random Access Memory), and the like. The direction detection unit 115 detects the moving direction of the operation tool 12 by using the plane area information transmitted from the plane area detection unit 111.

More specifically, the direction detection unit 109 detects the moving direction of the operation tool 12 based on the time variation of a coordinate value included in the plane area information transmitted at every predetermined time interval (e.g., at every several milliseconds to several hundred milliseconds). For example, there is set in the direction detection unit 115 a movement determination area utilized for determining presence or absence of the movement of the operation tool 12. This movement determination area can be set to be an arbitrary size, according to performance such as resolution capable of distinguishing the adjacent two positions in contact with or in proximity to each other on the touch panel 101A and/or 101B. The direction detection unit 115 determines that the operation tool 12 has moved when the transmitted plane area information changes beyond the range of this movement determination area. Moreover, when the transmitted plane area information changes within the range of this movement determination area, the direction detection unit 115 can determine that so-called tapping operation has been performed by the operation tool 12. Determination whether the operation tool 12 has been moved is performed on all pieces of the plane area information transmitted at the same timing. Namely, when two pieces of plane area information are transmitted at the same timing, the direction detection unit 115 performs the abovementioned determination regarding the time variation of each of the two pieces of plane area information according to time.

In addition, when the transmitted plane area information changes beyond the range of the movement determination area, the direction detection unit 115 detects, as the moving direction, the direction of vector generated by a trajectory drawn by the transmitted plane area information along with time variation. Moreover, the size of the abovementioned vector represents the moving distance of the operation tool 12. Furthermore, the direction detection unit 115 calculates the moving speed of the operation tool 12 by dividing the obtained moving distance by the moving time.

Figure 4:
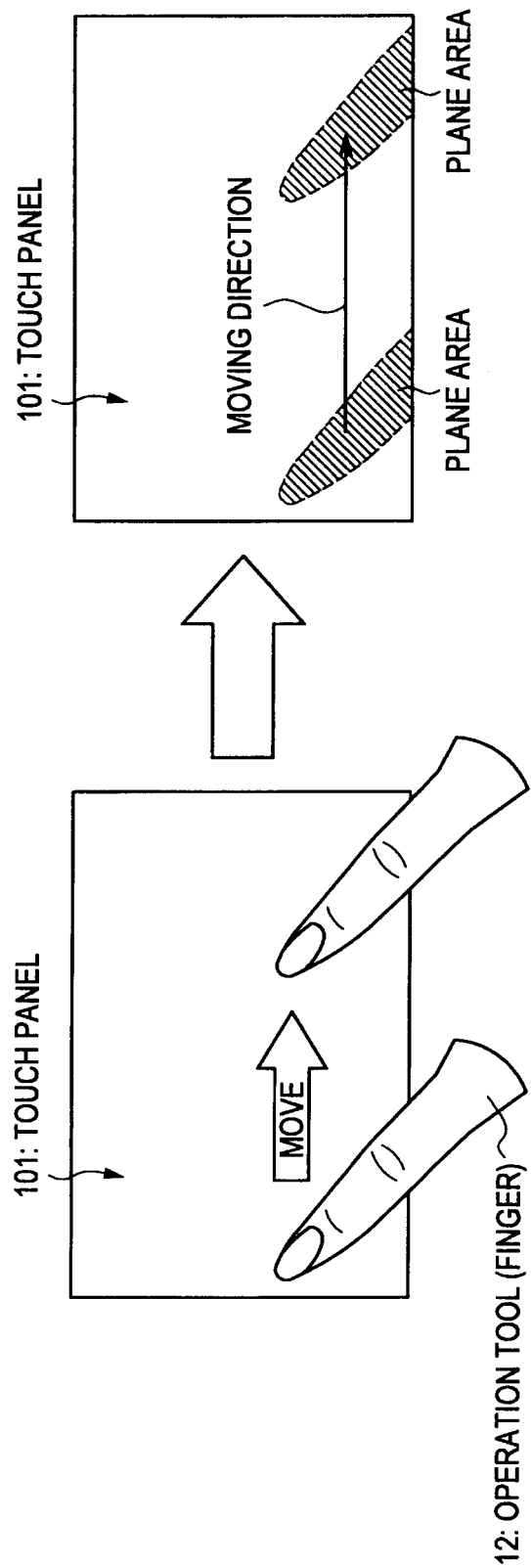
FIG. 4 is an explanatory diagram for explaining an example of an information processing method according to the embodiment.

For example, assume a case where there is only one touch panel in the information processing apparatus 10, and a finger which is an operation tool 12 moves from the left side to the right side, as shown in FIG. 4. In this case, the direction detection unit 115 detects, as the moving direction of the operation tool 12, an arrow represented by the vector defined by the plane area at the beginning of the movement and the plane area at the end of the movement. In this case, the direction detection unit 115 may consider the vectors of all the coordinate values composing the plane area and determine the moving direction by the direction of the vector sum, or may focus on a particular coordinate value such as the center of gravity of the plane area and detect the moving direction.

Figure 5:
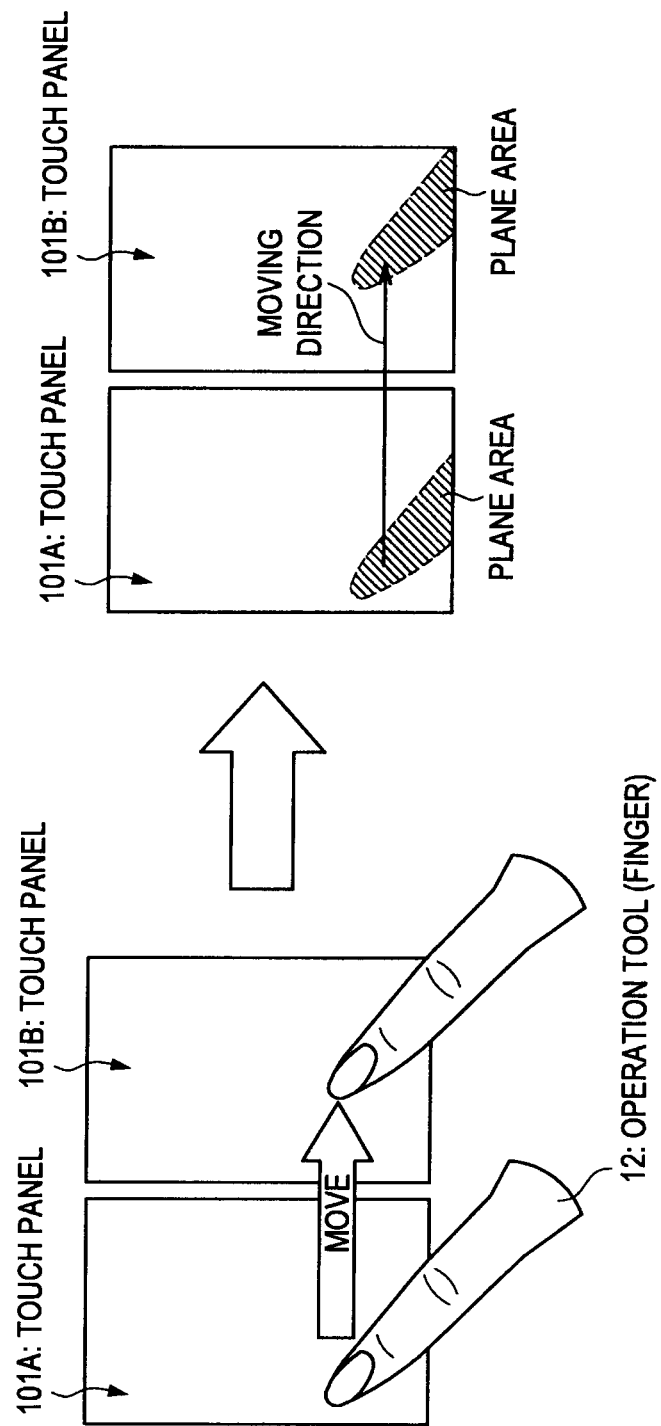
FIG. 5 is an explanatory diagram for explaining an example of the information processing method according to the embodiment.

Moreover, assume a case where there are tow touch panels 101A and 101B in the information processing apparatus 10, and the finger which is an operation tool 12 moves from the touch panel 101A on the left side to the touch panel 101B on the right side, as shown in FIG. 5. When time taken from the beginning to the end of the movement is within a predetermined time frame, and the movement from the touch panel 101A on the left side to the touch panel 101B on the right side can be considered as a series of actions, the direction detection unit 115 can detect the movement direction in the same manner as the case of FIG. 4.

Moreover, time necessary for the operation tool 12 to pass between the touch panel 101A and the touch panel 101B can be preset based on a distance between the touch panel 101A and the touch panel 101B. By this, when the time taken for the shadow of the operation tool 12 once disappeared at the end of one touch panel to be detected again by the other touch panel is within the preset time frame described above, the movement from one touch panel to the other can be regarded as a single action.

The direction detection unit 115 transmits to the application control unit 119 direction information including the moving direction and the moving speed of the operation tool 12 detected in the above-described manner.

The contact determination unit 117 is constituted by, for example, a CPU, a ROM, a RAM (Random Access Memory), and the like. The contact determination unit 117 determines whether the operation tool 12 contacts the surface of the touch panel 101A and/or 101B based on the plane area information transmitted at every predetermined time interval from the plane area detection unit 111. More specifically, the contact determination unit 117 determines if the operation tool 12 is in contact with in proximity to, or in neither of contact with nor proximity to, the touch panel 101A, and/or 101B according to the pixel value of pixels constituting the plane area.

In the following, contact determination processing of the operation tool 12 performed by the contact determination unit 117 will be described in more detail, with reference to FIG. 6A and FIG. 6B First, assume a case where the finger which is an operation tool 12 is in contact with the touch panel 101, as shown in FIG. 6A. When the operation tool 12 is in contact with the touch panel 101, the shadow of the operation tool 12 is cast upon the panel thickly. Moreover, when the operation tool is in contact state, it is considered that almost the whole part of the operation tool 12 is in contact with the touch panel 101. Accordingly, for example as shown in FIG. 6A, when the most part of the plane area transmitted from the plane area detection unit 111 is a part having a plurality of pixels with pixel values higher than a predetermined threshold value, the contact determination unit 117 determines that the operation tool 12 is in contact with the touch panel 101.

Next, assume a case where the finger which is an operation tool 12 is not in contact with, but in proximity to the touch panel 101, as shown in FIG. 6B. When the operation tool 12 is in proximity to the touchy panel 101, there may be two types of parts according to the shape of the operation tool 12 (e.g., finger); one is in closer proximity to the touch panel 101, and the other part is in less close proximity to the touch panel 101. Accordingly, for example as shown in FIG. 6B, within the plane area transmitted from the plane area detection unit 111, a part having a plurality of pixels with pixel values higher than a predetermined threshold value is positioned almost at the center thereof. Moreover, a part where pixel values of a plurality of pixels fade towards the outside (referred to as "gradation part", hereinafter) is positioned around the part having the plurality of pixels with pixel values higher than the predetermined threshold value. The degree of proximity of the operation tool 12 can be determined by the size of the part (area) having the plurality of pixels with pixel values higher than the predetermined threshold value, and the farther the operation tool 12 is distant from, the smaller the part having the plurality of pixels with high pixel values becomes. Accordingly, as shown in FIG. 6, when the plane area transmitted from the plane area detection unit 111 consists of a part having a plurality of pixels with pixel values higher than a predetermined threshold value and the gradation part larger than a predetermined size, the contact determination unit 117 determines that the operation tool 12 is in proximity to the touch panel 101.

In addition, when the user operates the operation tool 12 to bring it into contact with the touch panel 101, there is a state in which the operation tool 12 is in proximity to the touch panel 101 before the operation tool 12 becomes contact state. Accordingly, by performing determination described below, for example, the contact determination unit 117 can determine whether the operation tool 12 maintains the proximity state or transfers from the proximity state to contact state. That is, in case where the contact determination unit 117 determines that the operation tool 12 is in contact state within a predetermined time from when the contact determination unit 117 determines that the operation tool 12 is in proximity state, the contact determination unit 117 can determine that the operation tool 12 is not in proximity state but in contact state. In the same manner, in case where determination that the operation tool 12 is in contact state is not made within the predetermined time from when the contact determination unit 117 determines that the operation tool 12 is in proximity state, the contact determination unit 117 can determine that the operation tool 12 maintains the proximity state. Moreover, other than the determination method described above, in case where the operation tool 12 begins to move on a substantially parallel surface with the plane of the touch panel 101 within the predetermined time from when the contact determination unit 117 determines that the operation tool 12 is in proximity state, the contact determination unit 117 can determine that the operation tool 12 maintains the proximity state.

In addition, in the above description, the case where one touch panel is set on the information processing apparatus 10 has been described, but even in the case where there are two touch panels on the information processing apparatus 10, processing can be performed in the same manner.

Figure 7A:
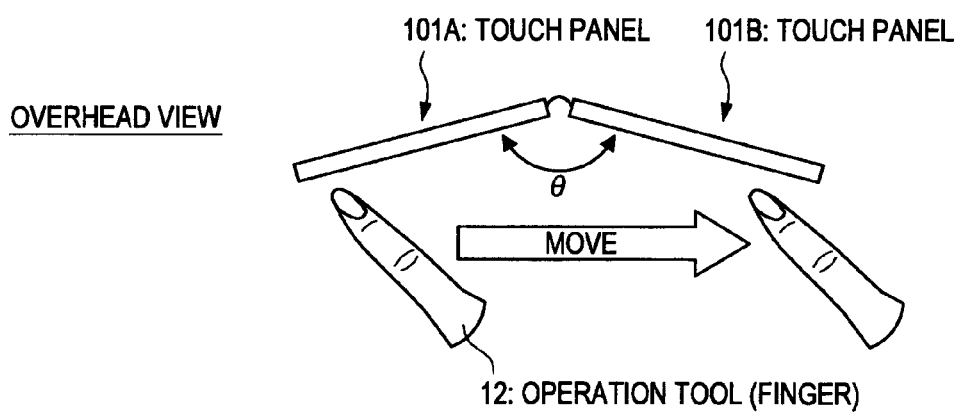
FIG. 7A is an explanatory diagram for explaining an example of the information processing method according to the embodiment.
Figure 7B:
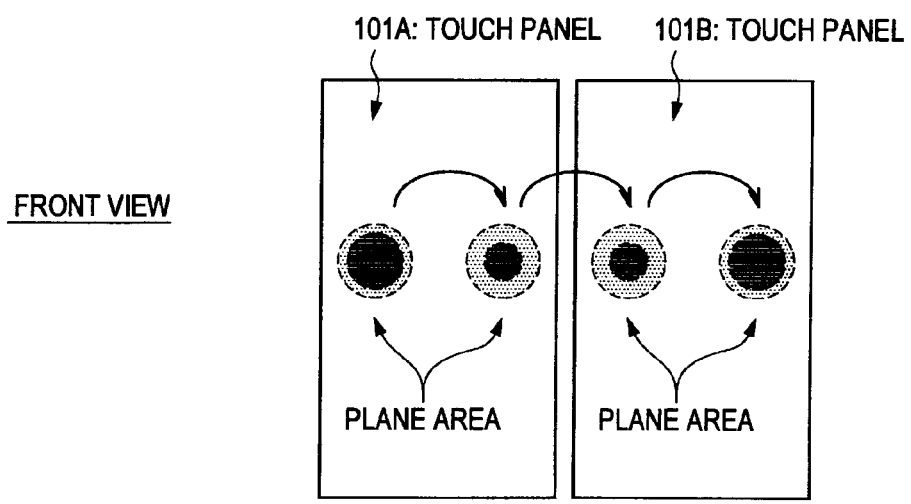
FIG. 7B is an explanatory diagram for explaining an example of the information processing method according to the embodiment.

Here, in case where the information processing apparatus 10 is a foldable apparatus as shown in FIG. 1B, there may occur a case where the two touch panels are not open in a straight line and are open at a predetermined angle θ (θ≠180°, for example, as shown in FIG. 7A. Assume that, in this case, the operation tool 12 moves from the touch panel 101A on the left side to the touch panel 101B on the right side. At this time, the plane area moves as shown in FIG. 7B illustrating the touch panels 101A and 101B in plane view.

Here, since the distance between the operation tool 12 and the touch panels is greater near a connection part where the tow touch panels are connected to each other, a part having pixels with pixel values higher than a predetermined threshold value is relatively small within the plane area. Accordingly, as shown in FIG. 7B, there is a change such that a part having pixels with high pixel values on the touch panel becomes smaller as the operation tool 12 moves toward the end of the touch panel at the connection part side, and on the other touch panel, a part having pixels with high pixel values becomes larger as the operation tool 12 moves away from the end at the connection part side. In this manner, when there is a change of pixel values shown as from dark to pale, to pale, and to dark as shown in FIG. 7B, the contact determination unit 117 does not perform determination separately on the each touch panel, but performs determination in the premise that a single operation moving from one touch panel to the other is performed. By performing such determination, the contact determination unit 117 can accurately perform contact determination in the premise of the operation tool 12 moving from one touch panel to the other.

Moreover, there may occur a case where although the user, when operating the operation tool 12, wants to move the operation tool 12 keeping proximity state, the operation tool 12 instantaneously contacts the touch panel. Accordingly, in case where contact state is observed within a predetermined time frame (or within a predetermined distance) during a movement of the plane area determined as a single operation, the contact determination unit 117 may determine that the proximity state is maintained, not determining that there is a change from proximity state to contact state, and to proximity state.

The contact determination unit 117 transmits, to the application control unit 119 described later, a determination result given by the method as such described above. That is, in case where the operation tool 12 is in contact state or in approximate state, the contact determination unit 117 transmits a notification to that effect to the application control unit 119.

In addition, in the above description, the case where the touch panel is a so-called in-cell type touch panel has been described, but by using an optical touch panel and a capacitive touch panel concurrently, it is possible to determine whether there is a contact state or a proximate state more accurately.

Referring back to FIG. 3, the configuration of the information processing apparatus 10 according to the present embodiment will be described in detail.

The application control unit 119 is constituted by, for example, a CPU, a ROM, a RAM, and the like. The application control unit 119 performs execution control of various types of applications stored in the storage unit 121 described later, ROM or the like, according to a moving direction of the operation tool 12 detected by the direction detection unit 115 and a contact determination result by the contact determination unit 117. More specifically, in case where the moving speed of the operation tool 12 is greater than a predetermined threshold value, the application control unit 119 regards that the moving direction transmitted from the direction detection unit 115 corresponds to a predetermined gesture, and controls an application based on the moving direction and the contact determination result. When a change occurs on the content to be displayed on the touch panel which is a display screen, the application control unit 119 requests the display control unit 113 a change of display screen.

In the information processing apparatus 10 according to the present embodiment, whether the operation tool 12 is in contact state or in proximity state can be determined. Accordingly, in an application on which the application control unit 119 performs execution control, even when moving directions (i.e., gestures) transmitted are the same, different processing can be related with the gesture depending on contact determination result. Accordingly, even when performing the same gestures, the user of the information processing apparatus 10 can execute different processing by choosing whether to bring the operation tool 12 in contact or in proximity.

The storage unit 121 stores therein various types of applications executed by the application control unit 119 included in the information processing apparatus 10 according to the present embodiment. The storage unit 121 also stores therein data related to information to be displayed on the display unit by an application on which the application control unit 119 performs execution control. The applications stored in the storage unit 121 is read out and executed by the application control unit 119. Moreover, an application in execution reads out the display data stored in the storage unit 121, and makes the display data be displayed on the display Moreover, the storage unit 121 stores therein object data to be displayed on the touch panels 101A and 101B. The object data referred here includes, for example, arbitrary parts constructing graphical user interface, such as icons, buttons, thumbnails, and the like. Moreover, attribute information is stored in the storage unit 121 along with each object data. The attribute information includes, for example, a created date and time of object data or data entity related with object data, an updated date and time, a name of updater, a type of data entity, size of data entity, a level of importance, a priority and the like.

Moreover, other than these data, the storage unit 121 can appropriately store therein various parameters and the reports on processing in progress necessary to be saved when some sort of processing is performed by the information processing apparatus 10, or various types of databases, and the like. The touch panels 101A and 101B, the plane area detection unit 111, the display control unit 113, the direction detection unit 115, the contact determination unit 117, the application control unit 119, or the like, can freely read and write from/into this storage unit 121.

As described above, an example of the function of the information processing apparatus 10 according to this embodiment has been shown. The each component described above may be configured by using a member or a circuit used for general purpose, or may be configured by hardware specialized for the functions of each component. Also, the functions of each component may be entirely performed by a CPU, or the like. Accordingly, the configuration to be utilized can be modified appropriately according to a technical level at the time of implementing this embodiment.

In addition, it is possible to create a computer program for realizing each function of the information processing apparatus according to the present embodiment as such described above, and mount it on a personal computer or the like.

<Regarding an Information Processing Method>

Figure 8:
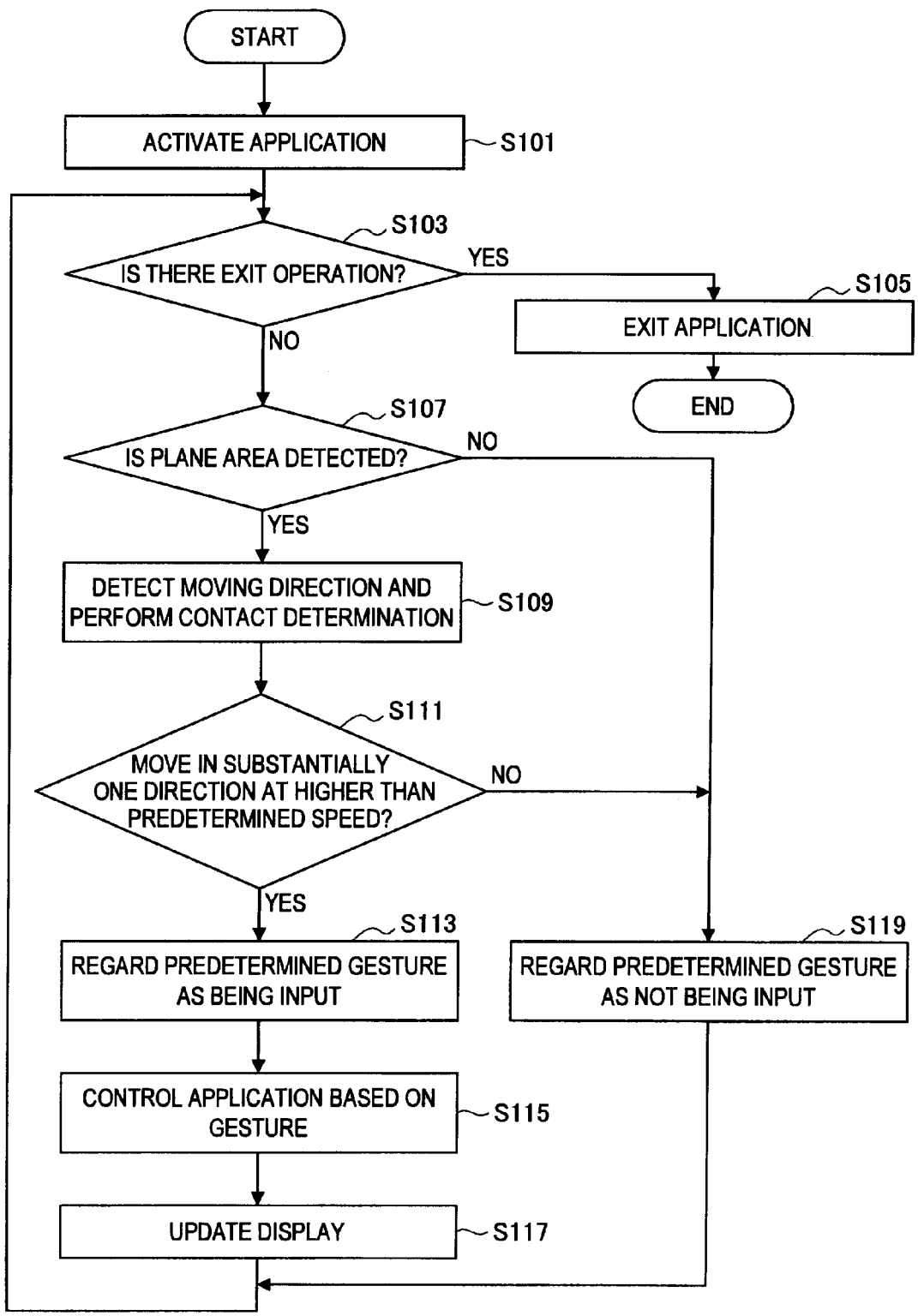
FIG. 8 is a flowchart for explaining the information processing method according to the embodiment.

Subsequently, an information processing method according to the present embodiment will be described in detail with reference to FIG. 8. FIG. 8 is a flowchart for explaining the processing method according to the present embodiment.

First, the user of the information processing apparatus 10 operates the touch panel 101 by using the operation tool 12 such as finger or stylus, and selects an object such as an icon related with the application which the user desires to execute. By this, the application control unit 119 of the information processing apparatus 10 activates the application related with the selected object (step S101).

Subsequently, the application control unit 119 waits for an input by the user, and determines whether termination operation of the application has been input (step S103). When the exit operation of the application is input by the user, the application control unit 119 terminates the running application (step S105).

Moreover, when a termination operation of the application is not input, the application control unit 119 further waits for an input by the user.

When the user contacts the touch panel 101 by operating the operation tool 12, the optical sensor 101 provided on the touch panel 101 detects intensity of light incident thereon from the outside of the touch panel 101. Moreover, the read circuit 107 detects the shadow of the operation tool 12 by reading out the intensity of the light detected by the optical sensor 105. The read circuit 107 transmits shadow data obtained in such manner to the plane area detection unit 111 as input positional information.

When receiving the input positional information, the plane area detection unit 111 detects a plane area based on the transmitted input positional information (step S107). In case where a plane area is detected, the plane area detection unit 111 transmits the detected plane area information to the display control unit 111, the direction detection unit 115, and the contact determination unit 117.

The direction detection unit 115 calculates the moving direction of the plane area (i.e., the moving direction of the operation tool 12) and the moving speed of the plane area, and transmits the result to the application control unit 119 as direction information (step S109). Moreover, the contact determination unit 117 determines, based on the transmitted plane area information, whether the operation tool 12 is in contact with, or in proximity to, the touch panel 101. After that, the contact determination unit 117 transmits the obtained determination result to the application control unit 119 (step S109).

The application control unit 119 refers to the transmitted directional information and determines whether the operation tool 12 moves in substantially one direction, and at the same time, moves at speed greater than a predetermined threshold value (step S111). In case where the operation tool 12 moves in substantially one direction, and at the same time, moves at higher than the predetermined speed, the application control unit 119 regards that a predetermined gesture is input (step S113). After that, the application control unit 119, based on the input gesture (the moving direction and the presence or absence of contact), controls an application (step S115). As a result of the application control, when it is necessary to change the content displayed on the display screen, the application control unit 119 transmits a notification to that effect to the display control unit 113. Receiving the request from the application control unit 119, the display control unit 113 updates the content displayed on the touch panel 101 which is a display screen step S117).

When the update of the display content is completed, the information processing apparatus 10 returns to the step S103, and waits for an user's input.

On the other hand, in case where the plane area detection unit 111 does not detect a plane area, or the operation tool 12 does not move in substantially one direction at higher than the predetermined speed, the application control unit 119 regards that a gesture is not input (step S119).

As described above, in the information processing method according to the present embodiment, it is possible to determine whether the operation tool 12 is in contact state or in proximity state. Accordingly, in an application on which the application control unit 119 performs execution control, even when transmitted moving directions (i.e., gestures) are the same, different processing can be related with the gesture depending on contact determination result. Accordingly, even when performing a single gesture, the user of the information processing apparatus 10 can execute different processing by choosing whether to bring the operation tool 12 in contact or in proximity.

<Regarding an Application Example of the Information Processing Method>

Figure 9:
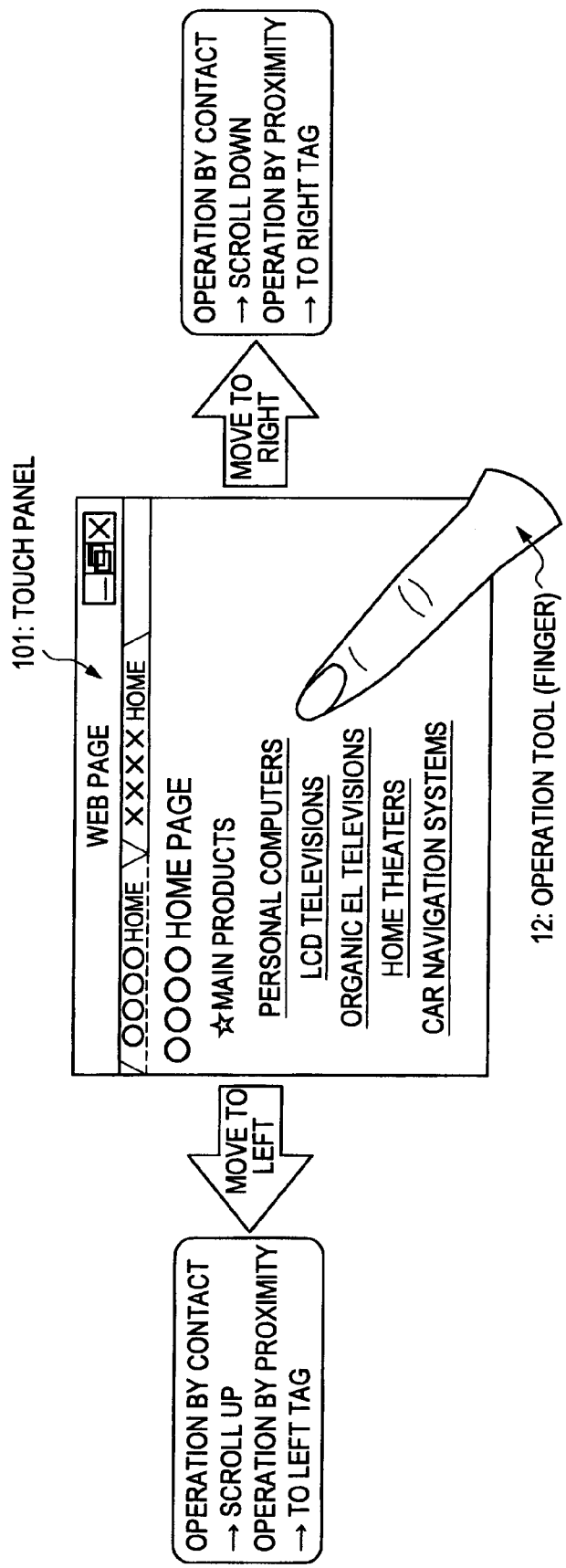
FIG. 9 is an explanatory diagram for explaining an application example of the information processing method according to the embodiment.
Figure 10:
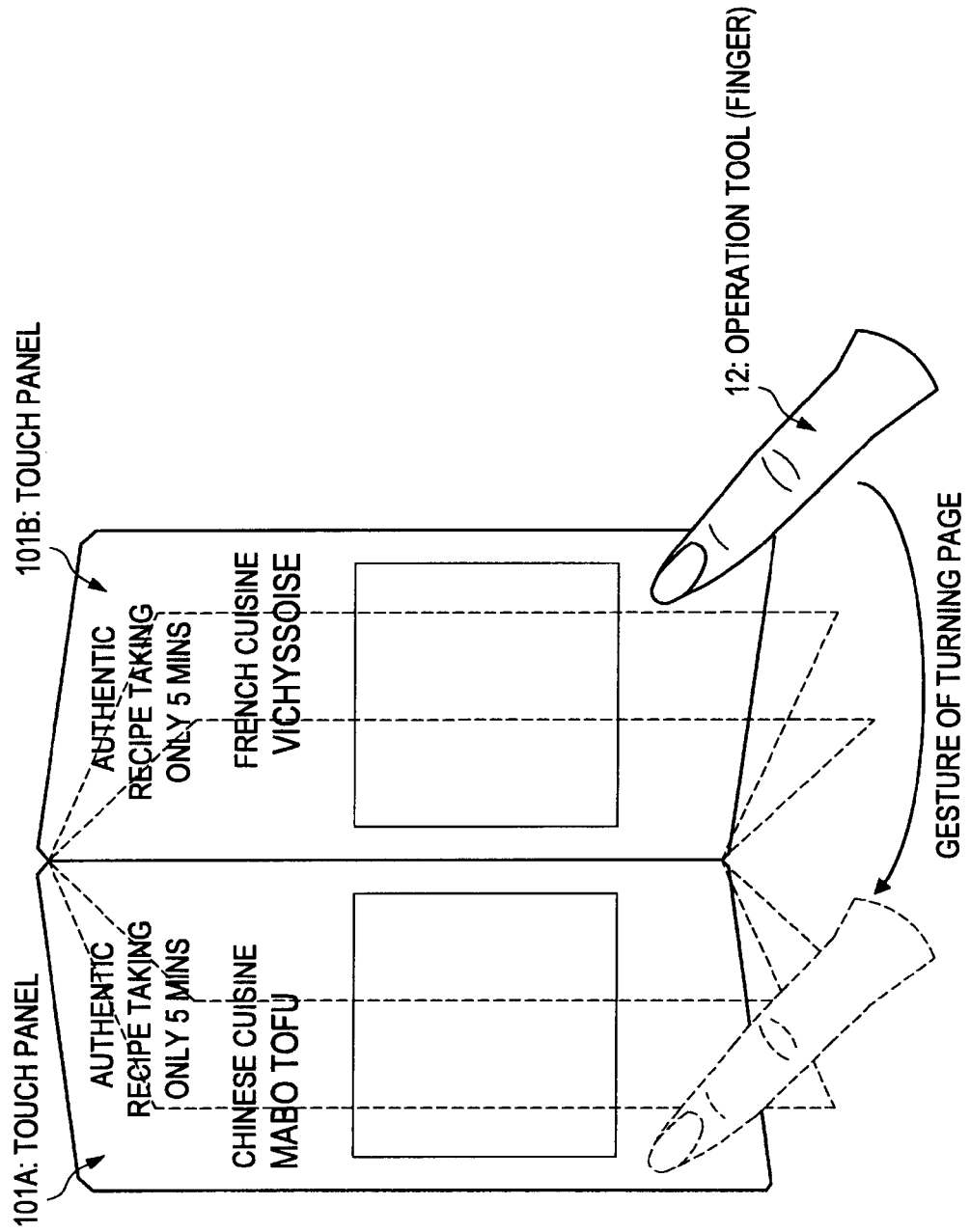
FIG. 10 is an explanatory diagram for explaining an example of the application of the information processing method according to the embodiment.

Next, an application example of the information processing method according to the present embodiment will be briefly described with reference to FIG. 9 and FIG. 10. FIG. 9 and FIG. 10 are explanatory diagrams for explaining application examples of the information processing method according to the present embodiment.

[Regarding an Example of Application to a WWW Browser]

First, an example in which the information processing method according to the present embodiment is applied to a WWW browser will be briefly described with reference to FIG. 9.

In an example shown in FIG. 9, a web page is displayed on the screen of the touch panel 101. The user of the information processing apparatus 10 can, for example, scroll the displayed web page, by dragging the operation tool 12 while keeping it in contact with the touch panel 101. For example, a browser can be set such that the web page displayed on the touch panel 101 scrolls down by the user dragging the operation tool 12 to the right while keeping it in contact with the touch panel 101. Similarly, the browser can be set such that the web page displayed on the touch panel 101 scrolls up by the user dragging the operation tool 12 to the left while keeping it in contact with the touch panel 101.

Moreover, an application can be set such that, in case where the operation tool 12 is in proximity to the touch panel 101, and a gesture operation of moving the operation tool 12 from the left side to the right side is recognized, a display is switched to a page linked to a tag on the right side of the tag of the currently viewed web page. Similarly, the application can be set such that, in response to a gesture operation of moving the operation tool 12 from the right side to the left side while keeping it in proximity state, a display is switched to a page linked to a tag on the left side of the tag of the currently viewed web page.

In a usual WWW browser, when drag is performed while contacting the touch panel, a function of switching tags is performed by a GUI button or the like. However, in the information processing apparatus according to the present embodiment, operation on a page can be performed without touching the screen, so that switching of tags can be realized by a gesture in the air.

[Regarding an Example of Application to a Book Reader Application]

Next, an example in which the information processing method according to the present embodiment is applied to a book reader application will be briefly described with reference to FIG. 10.

An example shown in FIG. 10 illustrates a case where the information processing apparatus 10 includes the two touch panels 101A and 101B, and a book reader application is executed in the information processing apparatus 10. In the book reader of the example shown in FIG. 10, each of the touch panels 101A and 101B displays a page containing a cook recipe.

In this case, the user of the information processing apparatus 10, when changing the displayed page, performs a gesture of turning the page similarly to an action of turning a page of a usual printed book without touching the screen.

When there is recognized a gesture operation in which the finger which is an operation tool 12 moves in space between the screens from the right panel to the left panel in proximity state, the application control unit 119 of the information processing apparatus 10 performs processing for turning the displayed page forward. Similarly, when there is recognized a gesture operation in which the finger which is an operation tool 12 moves in space between the screens from the left panel to the right panel in proximity state, the application control unit 119 of the information processing apparatus 10 performs processing for turning the displayed page back to the previous page.

In this way, in the information processing apparatus and the information processing method according to the present embodiment, operation on a page is possible without touching the screen, so that even when a hand is wet or dirty in the middle of cooking, touch panel operation can be performed without making the display screen dirty.

<Regarding a Hardware Configuration>

Figure 11:
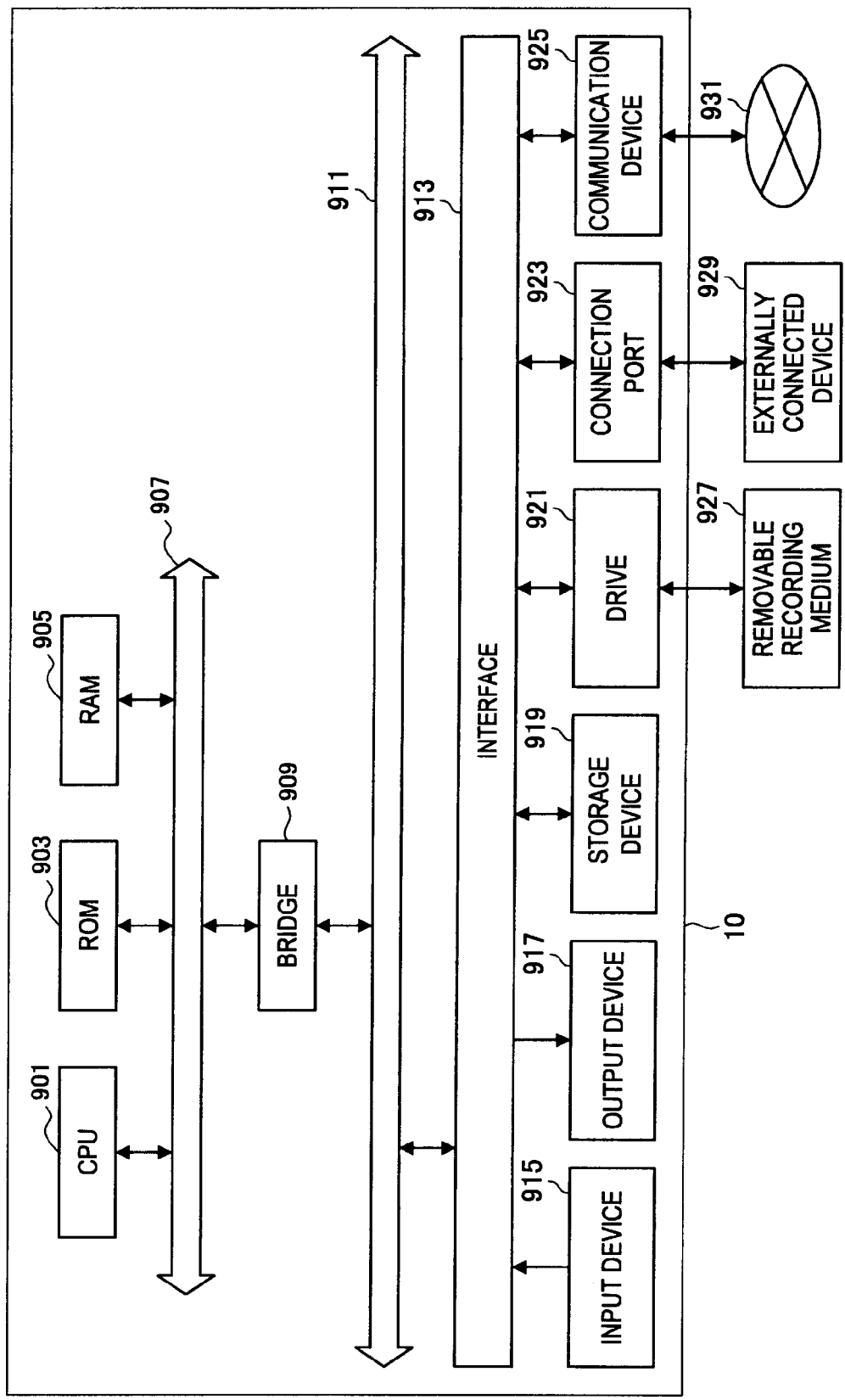
FIG. 11 is a block diagram for explaining a hardware configuration of the information processing apparatus according to each embodiment of the present invention.

Next, a hardware configuration of the information processing apparatus according to each embodiment of the present invention will be described in detail with reference to FIG. 11. FIG. 11 is a block diagram for explaining the hardware configuration of the information processing apparatus 10 according to each embodiment of the present invention.

The information processing apparatus 10 mainly includes a CPU 901, a ROM 903, and a RAM 905. Moreover, the information processing apparatus 10 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the entire or a part of operation within the information processing apparatus 10 according to various types of programs stored in the ROM 903, the RAM 905, the storage device 919, or a removable recording medium 927. The ROM 903 stores therein programs, calculation parameters and the like used by the CPU 901. The RAM 905 primarily stores therein programs executed by the CPU 201, parameters appropriately changing in the execution, and the like. These are interconnected via a host bus 907 including an internal bus such as CPU bus.

The host bus 907 is connected to an external bus such as PCI (Peripheral Component Interconnect/Interface) bus via the bridge 909.

The input device 915 is an input means operated by the user such as mouse, keyboard, touch panel, button, switch and lever. Moreover, the input device 915 may be a remote controlling means (so-called remote controller) using infrared rays or other radio waves, or may be an externally connected device 929 such as cell phone or PDA corresponding to the operation of the information processing apparatus 10, for example. Furthermore, the input device 915 includes, for example, an input control circuit for generating an input signal based on information input by the user who uses the above-mentioned operation means and outputting the input signal to the CPU 901. By operating this input device 915, the user of the information processing apparatus 10 can input various types of data into, or provide an operation instruction to, the information processing apparatus 10.

The output device 917 is constituted by, for example, a device capable of notifying the user of acquired information visually or audibly. Examples of such devices are a display unit such as CRT display device, liquid crystal display device, plasma display device, EL display device, an audio output device such as speaker and head phone, a printer device, a cell phone, and a facsimile. The output device 917 outputs a result obtained by various processing performed by the information processing apparatus 10, for example. Specifically, a display device displays the result obtained by various types of processing performed by the information processing apparatus 10 in the form of text or image. On the other hand, an audio output device converts audio signals composed of reproduced sound data, audio data and the like to analog signals and outputs them.

The storage device 919 is a data storage device configured as an example of the storage unit of the information processing apparatus 10. The storage device 919 is constituted by, for example, a magnetic memory device such as HDD (Hard Disk Drive), a semiconductor memory device, an optical memory device, or a magneto-optical memory device. This storage device 919 stores therein programs and various types of data executed by the CPU 901 and various types of data obtained from the outside.

The drive 921 is a reader/writer for recording medium and is built in or externally attached to the information processing apparatus 10. The drive 921 reads out information recorded in the attached removable recording medium 927 such as magnetic disk, optical disk, magneto-optical disk, and semiconductor memory, and outputs the information to the RAM 905. Moreover, the drive 921 can write record into the attached removable recording medium such as the magnetic disk, optical disk, magneto-optical disk, and semiconductor memory. The removable recording medium 927 is, for example, a DVD media, a HD-DVD media, or Blu-ray media. Moreover, the removable recording medium 927 may be a compact flash (registered trade mark) (Compact Flash: CF), a memory stick, or a SD memory card (Secure Digital memory card), or the like. Moreover, the removable recording medium 927 may be an IC card (Integrated Circuit card) on which a noncontact IC chip is mounted, an electronic device, or the like.

The connection port 923 is a port for connecting a device directly to the information processing apparatus 10. Examples of the connection port 923 are a USB (Universal Serial Bus) port, an IEEE1394 port such as i.Link, a SCSI (Small Computer System Interface) port, RS-232C port, an optical audio terminal, HDMI (High-Definition Multimedia Interface) port, and the like. Other examples of the connection port 923 are a RS-232C port, an optical audio terminal, HDMI (High-Definition Multimedia Interface) port, and the like. By the externally connected device 929 being connected to this connection port 923, the information processing apparatus 10 obtains various types of data directly from the externally connected device 929 and provides various types of data to the externally connected device 929.

The communication device 925 is a communication interface constituted by a communication device for accessing a communication network 931, for example. The communication device 925 is, for example, a communication card for wired or wireless LAN (Local Area Network), for Bluetooth, or for WUSB (Wireless USB). The communication device 925 may be a rooter for optical communication, a rooter for ADSL (Asymmetric Digital Subscriber Line), or a modem for various types of communication. For example, this communication device 925 can transmit and receive audio signals and the like to and from the Internet or other communication devices, for example based on a predetermined protocol such as TCP/IP. Moreover, the communication network 931 accessed by the communication device 925 is constituted by a network connected via wire or wirelessly, or the like, and may be the Internet, home LAN, infrared ray communication, radio wave communication or satellite communication, for example.

An example of the hardware configuration which can achieve the function of the information processing apparatus 10 according to each embodiment of the present invention has been described above. The each component described above may be configured by using a general-purpose member or may be configured by hardware specialized for the function of each component. Accordingly, the hardware configuration to be utilized can be modified appropriately according to a technical level at the time of implementing this embodiment.

<Summary>

As described above, in the information processing apparatus and the information processing method according to the embodiment of the present invention, even the same gestures can be related with different processing depending on whether operation is performed by bringing the operation tool in contact with the touch panel or in proximity to the touch panel.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the embodiment described above, the application examples have been described taking the WWW browser and the book reader application as examples, but application examples of the present invention are not limited thereto, and the information processing method according to the present invention can be applied to various applications.

The present application contains subject matter related to that disclosed in Japanese Priority Patent Application JP 2009-000416 filed in the Japan Patent Office on Jan. 5, 2009, the entire content of which is hereby incorporated by reference.

What is claimed is:

1. An information processing apparatus comprising:
a display panel for displaying a plurality of objects;
a plane area detection unit for detecting an operation tool positioned on the display panel and for detecting a plane area corresponding to the operation tool on the display panel;
a direction detection unit for detecting a moving direction of the operation tool based on variation of position of the plane area according to time detected by the plane area detection unit;
a contact determination unit for determining whether the operation tool is in a proximity state or in a contact state with the display panel based on the plane area detected by the plane area detection unit; and
an application control unit for controlling an application according to a determination of a contact state result by the contact determination unit and the moving direction of the operation tool detected by the direction detection unit,
wherein responsive to a determination that a movement of the operation tool after a contact with the display panel is less than a predetermined distance when the operation tool is in a proximity state, the contact determination unit does not determine that the operation tool switches to the contact state from the proximity state.

2. The information processing apparatus according to claim 1, wherein
the plane area detection unit transmits to the contact determination unit the pixel value of one or more pixels included in the plane area among pixels constituting the display panel, and
the contact determination unit determines if the operation tool is in contact with, in proximity to, or in neither of contact with nor proximity to, the display panel, according to the pixel value of the one or more pixels constituting the plane area.

3. The information processing apparatus according to claim 2, wherein
when there is an area larger than a predetermined area within the plane area, having a plurality of pixels with pixel values higher than a predetermined threshold value,
the contact determination unit determines that the operation tool is in contact state, and
when the plane area consists of an area having a plurality of pixels with pixel values higher than a predetermined threshold value and an area where pixel values of a plurality of pixels fade towards the outside,
the contact determination unit determines that the operation tool is in proximity state.

4. The information processing apparatus according to claim 3, wherein
the direction detection unit additionally calculates the moving speed of the operation tool based on the variation of position of the plane area according to time, and
the application control unit, when the moving speed is greater than a predetermined threshold value, controls the application according to the contact determination result and the moving direction of the operation tool.

5. The information processing apparatus according to claim 4, wherein
the information processing apparatus includes two display panels,
the plane area detection unit detects each of the plane area formed by the operation tool on the each display panel,
the direction detection unit further detects a moving direction of the operation tool moving from one of the two display panels to the other, and
the contact determination unit determines contact state of the operation tool on the each display panel.

6. The information processing apparatus according to claim 5, wherein
the application controlled by the application control unit is an application for allowing an object having different content to be displayed on each of the two display panels, and
the application control unit, when the movement of the operation tool detected by the direction detection unit is a single movement from one of the two touch panels to the other, updates the content of the object displayed on the each display panel.

7. The information processing apparatus according to claim 1,
wherein the contact determination unit determines that the operation tool is in the proximity state with the display panel based on the plane area detected by the plane area detection unit and pixel values higher than a predetermined threshold.

8. An information processing method, comprising the steps of:
displaying a plurality of objects;
detecting an operation tool positioned on the display panel and for detecting a plane area corresponding to the operation tool on the display panel;
detecting a moving direction of the operation tool based on variation of position of the plane area according to time detected by the plane area detection unit;
determining whether the operation tool is in a proximity state or in a contact state with the display panel based on the plane area detected by the plane area detection unit; and
controlling an application according to a determination of a contact state result by the contact determination unit and the moving direction of the operation tool detected by the direction detection unit,
wherein responsive to a determination that a movement of the operation tool after a contact with the display panel is less than a predetermined distance when the operation tool is in a proximity state, the contact determination unit does not determine that the operation tool switches to the contact state from the proximity state.

9. A program, encoded on a non-transitory computer readable medium, to cause a computer including a display panel for displaying a plurality of objects to realize functions of:
detecting an operation tool positioned on the display panel and for detecting a plane area corresponding to the operation tool on the display panel;
detecting a moving direction of the operation tool based on variation of position of the plane area according to time detected by the plane area detection unit;
determining whether the operation tool is in a proximity state or in a contact state with the display panel based on the plane area detected by the plane area detection unit; and controlling an application according to a determination of a contact state result by the contact determination unit and the moving direction of the operation tool detected by the direction detection unit, wherein responsive to a determination that a movement of the operation tool after a contact with the display panel is less than a predetermined distance when the operation tool is in a proximity state, the contact determination unit does not determine that the operation tool switches to the contact state from the proximity state.

* * * * *